(12) United States Patent
Wang

(10) Patent No.: US 6,283,348 B1
(45) Date of Patent: Sep. 4, 2001

(54) CELLULAR TELEPHONE CLIP

(76) Inventor: Chin-Yang Wang, No. 271, Zhen Chyan Street, Shul Lin, Taipei Hsien (TW)

( * ) Notice: Subject to any disclaimer, the term of this patent is extended or adjusted under 35 U.S.C. 154(b) by 0 days.

(21) Appl. No.: 09/543,566

(22) Filed: Apr. 5, 2000

(51) Int. Cl.⁷ ........................................................ A45F 5/00
(52) U.S. Cl. .......................... 224/271; 224/197; 224/930; 24/3.11; 24/3.12
(58) Field of Search ................................. 24/3.11, 3.13, 24/590, 591, 592, 692, 633; 224/197, 268, 269, 930, 271

(56) References Cited

U.S. PATENT DOCUMENTS

| | | | |
|---|---|---|---|
| 5,730,342 | * 3/1998 | Tien | 224/271 |
| 5,850,954 | * 12/1998 | Dong-Joo | 224/197 |
| 5,996,184 | * 12/1999 | Mah et al. | 24/3.12 |
| 6,006,969 | * 12/1999 | Kim | 224/197 |

* cited by examiner

Primary Examiner—James R. Brittain
Assistant Examiner—Ruth C. Rodriguez
(74) Attorney, Agent, or Firm—Dougherty & Troxell

(57) ABSTRACT

A cellular telephone clip is constructed to include a mount fastened to a cellular telephone or cellular telephone bag, a hollow holder base for securing the mount, the holder base having a front coupling chamber, a back receiving chamber, and a slot communicating between the coupling chamber and the receiving chamber, a locating block mounted in the back receiving chamber and forced by a springy holding down plate to insert through the slot into the coupling chamber and to lock the mount after insertion of the mount in the coupling chamber, a spring-supported push button coupled to the base holder and moved between a first position where the locating block is moved away from the slot for the access of the mount to the coupling chamber, and a second position where the locating block is engaged into the slot to lock the mount in the coupling chamber, a locating cover plate fastened to the holder base at the back, and a clamping plate pivoted to the locating cover plate and retained in the clamping position by spring.

7 Claims, 3 Drawing Sheets

CELLULAR TELEPHONE CLIP

BACKGROUND OF THE INVENTION

1. Field of the Invention

The present invention relates to a cellular telephone clip, and more particularly to such a cellular telephone clip, which comprises a mount fastened to a cellular telephone or cellular telephone bag, a holder base for holding the mount, a locating block controlled by a push button to lock the mount, and a clamping plate pivoted to a locating cover plate at a back side of the holder base for securing the cellular telephone clip to, for example, the user's belt.

2. Description of Related Art

FIG. 1 shows a cellular telephone clip according to the prior art. This structure of cellular telephone clip comprises a mount E fixedly fastened to a cellular telephone or cellular telephone bag, a holder base A for holding the mount E, and a clip B mounted on the holder base A for fastening to, for example, the user's belt. The mount E comprises a hollow coupling flange F. The holder base A comprises a front coupling flange G for receiving the hollow coupling flange F of the mount E, a latch D, and a control knob C controlled to move the latch D between the locking position where the latch D is forced into engagement with the coupling flange F of the mount E, and the unlocking position where the latch D is disengaged from the coupling flange F of the mount E, enabling the mount E to be disconnected from the coupling flange G of the holder base A. This structure of cellular telephone clip is still not satisfactory in function because the engagement between the coupling flange F of the mount E and the latch D tends to be destroyed. Further, when installed, the cellular telephone cannot be turned outwards from the holder base A for viewing the message shown on the display of the cellular telephone.

SUMMARY OF THE INVENTION

The present invention has been accomplished to provide a cellular telephone clip, which eliminates the aforesaid drawbacks.

According to one aspect of the present invention, the cellular telephone clip comprises a mount fastened to a cellular telephone or cellular telephone bag, a hollow holder base for securing the mount, the holder base having a front coupling chamber, a back receiving chamber, and a slot communicating between the coupling chamber and the receiving chamber, a locating block mounted in the back receiving chamber and forced by a springy holding down plate to insert through the slot into the coupling chamber and to lock the mount after insertion of the mount in the coupling chamber, a spring-supported push button coupled to the base holder and moved between a first position where the locating block is moved away from the slot for the access of the mount to the coupling chamber, and a second position where the locating block is engaged into the slot to lock the mount in the coupling chamber, a locating cover plate pivoted to the holder base, and a clamping plate pivoted to the locating cover plate and retained in the clamping position by spring means.

According to another aspect of the present invention, the locating cover plate is pivoted to the holder base at the back side, so that the user can turn the cellular telephone with the mount and the holder back forwards from the locating cover plate after fastening of the clamping plate to the belt.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
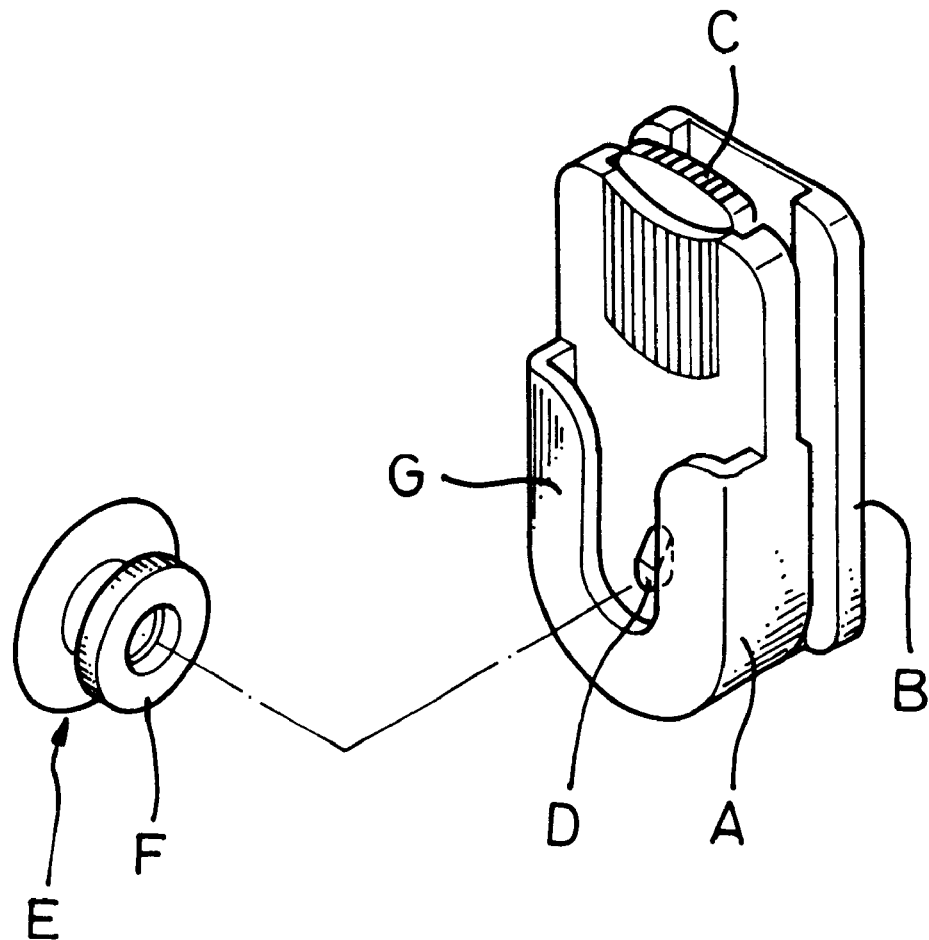
FIG. 1 is an exploded view of a cellular telephone clip according to the prior art.
Figure 2:
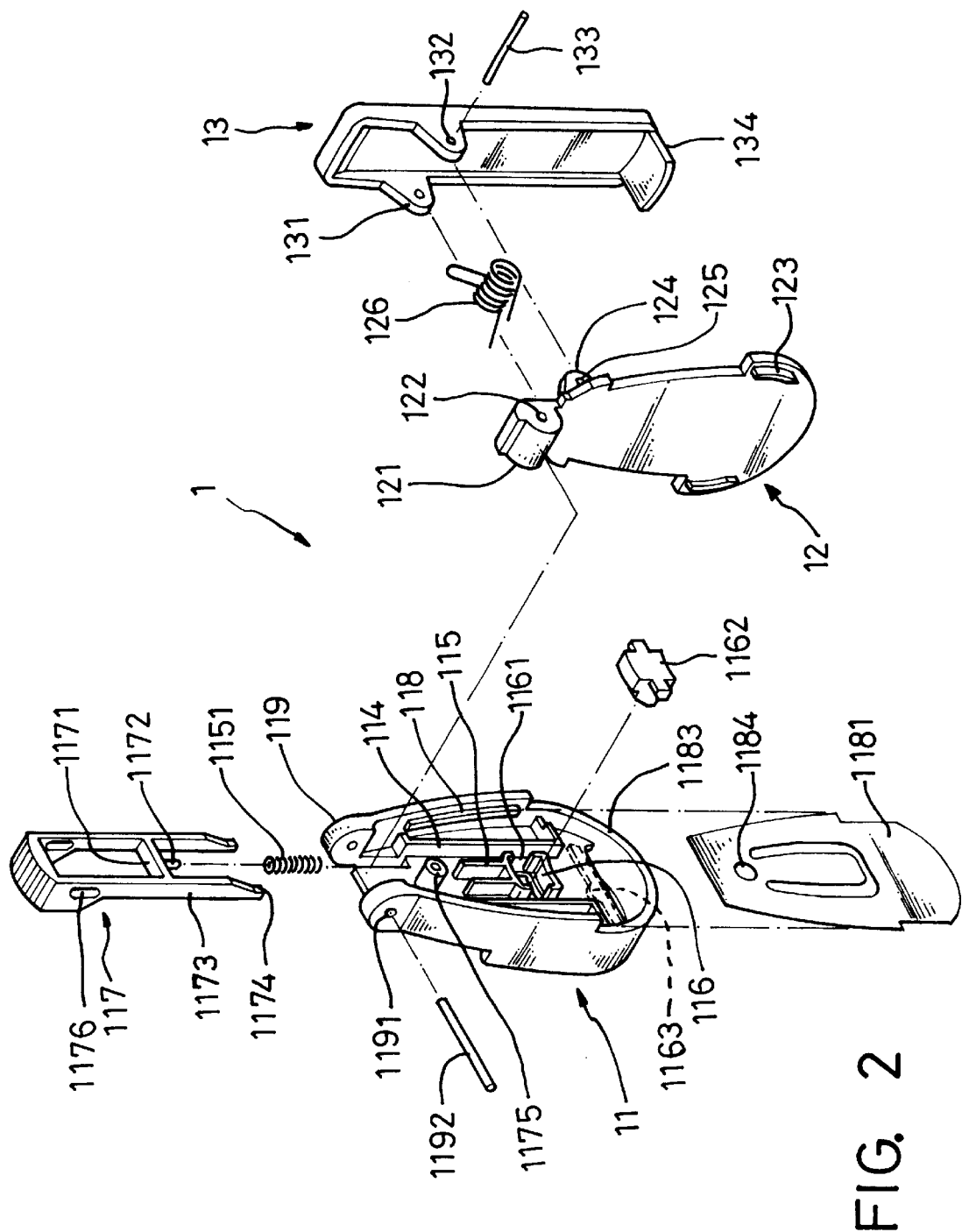
FIG. 2 is an exploded view of a cellular telephone clip according to the present invention (the mount excluded)
Figure 3:
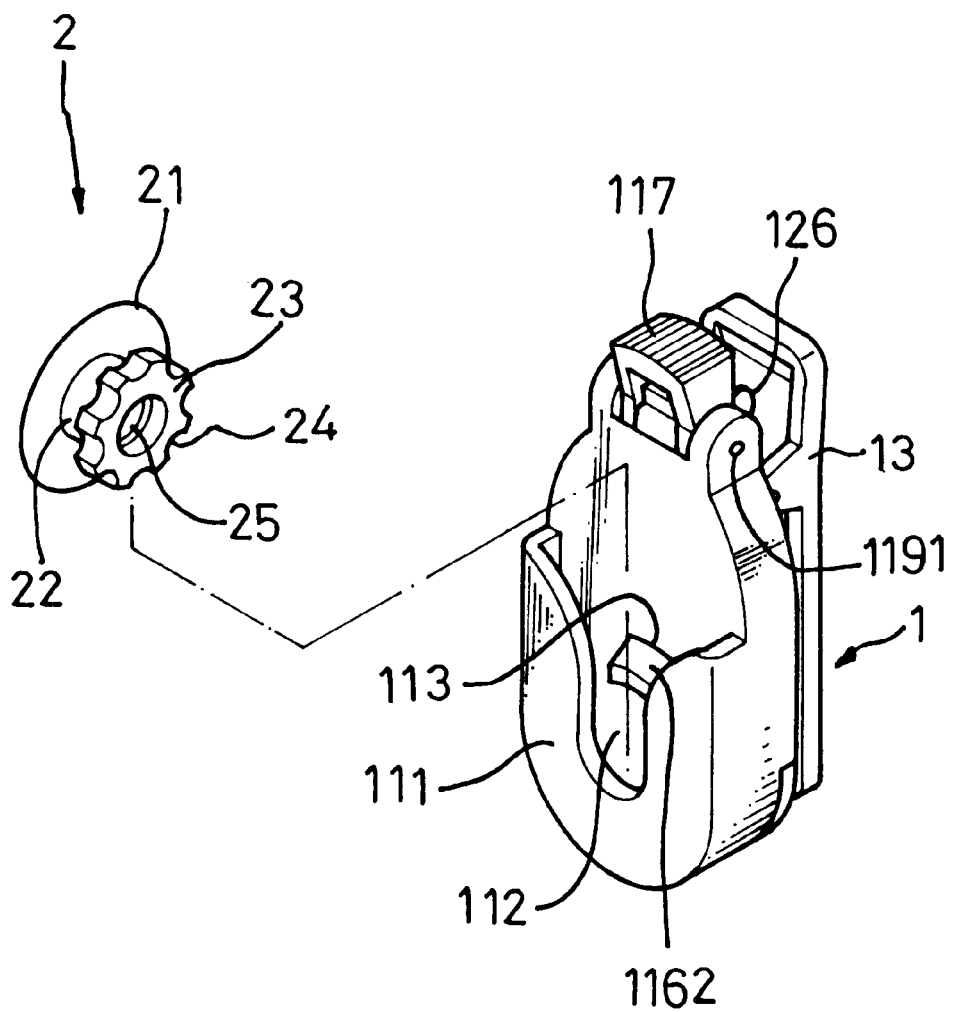
FIG. 3 is an assembly view of the cellular telephone clip according to the present invention.

Referring to FIGS. 2 and 3, a cellular telephone clip 1 is shown comprised of a holder base 11, a locating cover plate 12, and a clamping plate 13.

The holder base 11 is a three-side hollow shell comprising a protruded flange 111 raised from the front side wall thereof and defining with the front side wall a coupling chamber 112 for holding a mount 2, a slot 113 through the front side wall, a locating rib 1163 in the coupling chamber 112 at the bottom side, two longitudinal rails 114 bilaterally formed integral with a back of the wall thereof, two back flanges 115 spaced between the longitudinal rails 114, a back chamber 116 disposed below the back flanges 115, two notches 1161 at two opposite lateral side walls of the back chamber 116, two lugs 119 respectively forwardly extended from the two opposite lateral side walls and defining a respective pivot hole 1191, a locating peg 1175 raised from a back of the wall and suspended above the back flanges 115, two longitudinal sliding grooves 118 respectively formed on the two opposite lateral side walls at an inner side, and a back step 1183 at one end remote from the lugs 119.

A spring 1151 is supported above the back chamber 116 between the back flanges 115. A locating block 1162 is received in the back chamber 116, and partially inserted into the slot 113. The locating block 1162 has two protruded side portions respectively extended out of the back chamber 116 through the notches 1161. A push button 117 is longitudinally slidably inserted into the holder base 11 between the longitudinal rails 114 and supported on the spring 1151, comprising two longitudinal push rods 1173 arranged in parallel, the longitudinal push rods 1173 each having a beveled tip 1174 respectively disposed in contact with the locating block 1162, a transverse rib 1171 connected between the push rods 1173, a pin 1172 perpendicularly downwardly extended from the transverse rib 1171 and coupled to one end, namely, the top end of the spring 1151, and a longitudinal sliding slot 1176 respectively formed on each longitudinal push rod 1173 near one end remote from the beveled tip 1174. A pivot pin 1192 is inserted through the longitudinal sliding slot 1176 and fastened to the pivot hole 1191 on each lug 119 to hold the push button 117 in the holder base 11 and to limit the range of movement of the push button 117 in the holder base 11. After installation of the push button 117, the transverse rib 1171 is suspended between the locating peg 1175 and the back flanges 115.

A springy holding down plate 1181 is inserted into the longitudinal sliding groove 118 and covered over the back chamber 116 to force the locating block 1162 into the slot 113, comprising a mounting hole 1184 fixedly fastened to the locating peg 1175 with, for example, a screw. After installation of the cover plate 1181 in the holder base 11, two coupling holes (not shown) are formed between two opposite lateral sides of the cover plate 1181 and the opposite lateral side walls of the holder base 11.

The locating cover plate 12 comprises a coupling block 121 formed integral with one end thereof and coupled between the longitudinal push rods 1173 of the push button 117, a pivot hole 122 extended through the coupling block 121, which receives the pivot pin 1192 for enabling the locating cover plate 12 to be turned about the pivot pin 1192, two locating flanges 123 bilaterally raised from the back side wall thereof and respectively fitted into the coupling holes to secure the locating cover plate 12 to the holder base 11 in position, and two front lugs 124 raised from the front side wall thereof near the coupling block 121 and defining a respective pivot hole 125.

The clamping plate 13 comprises two back lugs 131 bilaterally perpendicularly raised from the back side wall thereof and defining a respective pivot hole 132, and a stop flange 134 perpendicularly backwardly raised from one bottom end thereof remote from the back lugs 131. A pivot pin 133 is inserted through the pivot hole 132 on each back lug 131 and the pivot hole 122 on the coupling block 122 to secure the clamping plate 13 and the locating cover plate 12 together, enabling the clamping plate 13 to be turned about the pivot pin 133 relative to the locating cover plate 12. Further, a torsional spring 126 is mounted on the pivot pin 133 and stopped between one end of the locating cover plate 12 and one end of the clamping plate 13 to hold the clamping plate 13 in the clamping position where the stop flange 134 of the clamping plate 13 is pressed on the front side wall of the locating cover plate 12.

The aforesaid mount 2 comprises a mounting base 21, a toothed locating cover plate 23 having teeth 24 around the periphery, a neck 22 connected between the mounting base 21 and the toothed locating cover plate 23, and a mounting hole 25 axially extended through the mounting base 21, the neck 22 and the toothed locating cover plate 23. By means of the mounting base 21 and the mounting hole 25, the mount 2 is fixedly fastened to a cellular telephone or cellular telephone bag.

After installation of the mount 2 in the cellular telephone, the push button 117 is pressed down to push the locating block 1162 backwards (when the push button 117 is lowered) the beveled tips 1174 of the longitudinal push rods 1173 are respectively forced against the locating block 1162, thereby causing the locating block 1162 to be moved backwardly away from the slot 113, and then the toothed locating cover plate 23 is inserted with the mount 2 into the coupling chamber 112 and forced into engagement with the locating rib 1163 in the coupling chamber 112, and then the push button 117 is released from the hand and pushed upwardly away from the locating block 1162 by the spring 1151, enabling the locking block 1162 to be forced forwards by the springy holding down plate 1181 into slot 113 and engaged with the teeth 24 of the toothed locating cover plate 23 at the top side (where the locating rib 1163 is engaged with the teeth 24 of the toothed locating cover plate 23 at the bottom side), and therefore the mount 2 and the cellular telephone clip 1 are fastened together.

By means of the clamping plate 13, the cellular telephone can be fastened with the mount 2 and the cellular telephone clip 1 to the user's belt. When pushing down the push button 117 again, the locating block 1162 is disengaged from the toothed locating cover plate 23, enabling the cellular telephone to be disconnected with the mount 2 from the cellular telephone clip 1.

While only one embodiment of the present invention has been shown and described, it will be understood that various modifications and changes could be made thereunto without departing from the spirit and scope of the invention disclosed.

What is claimed is:

1. A cellular telephone clip comprising:

a mount for securing a cellular telephone;

a hollow holder base for securing said mount, said holder base comprising a protruded flange raised from a front side wall thereof and defining with the front side wall a coupling chamber, a back chamber, and a slot through the front side wall in communication with said back chamber;

a locating block mounted in said back chamber;

a springy holding down plate fastened to said holder base and covered over said back chamber to force said locating block into said slot;

first spring means installed in said holder base;

a push button coupled to said holder base by a slip joint and supported on said first spring means, said push button having two beveled tips arranged in parallel and respectively disposed in contact with said locating block;

a locating cover plate pivoted to said holder base, said locating cover plate having locating means coupled to said holder base to secure said locating cover plate in place;

a clamping plate pivoted to said locating cover plate; and second spring means coupled between said locating cover plate and clamping plate to hold said clamping plate clamped on said locating cover plate;

wherein when said push button is depressed by a user to compress said first spring means, said locating block is moved backwards from said slot for enabling said mount to be inserted into said coupling chamber, and said locating block is forced forwards by said springy holding down plate into engagement with said mount in said coupling chamber after the user released said push button.

2. The cellular telephone clip of claim 1 wherein said mount comprises a mounting base for fastening to a object to be held, a toothed locating cover plate having teeth around a periphery thereof for engagement with said locating block, and a neck connected between said mounting base and said toothed locating cover plate.

3. The cellular telephone clip of claim 2 wherein said mounting base of said mount is fixedly fastened to a cellular telephone.

4. The cellular telephone clip of claim 2 wherein said mounting base of said mount is fixedly fastened to a cellular telephone bag.

5. The cellular telephone clip of claim 1 wherein said holder base further comprises a locating rib disposed in said coupling chamber at a bottom side for engagement with a toothed locating cover plate of said mount after insertion of the toothed locating cover plate of said mount into said coupling chamber.

6. The cellular telephone clip of claim 1 wherein said holder base comprises two longitudinal rails bilaterally disposed at a back side thereof to guide movement of said push button, and two back flanges spaced between said longitudinal rails to hold said first spring means above said back chamber.

7. The cellular telephone clip of claim 1 wherein said push button comprises a transversely extended middle rib, and a pin perpendicularly downwardly extended from said transversely extended middle rib and coupled to one end of said first spring means.

* * * * *